(12) United States Patent
Nakamura et al.

(10) Patent No.: US 12,433,628 B2
(45) Date of Patent: Oct. 7, 2025

(54) FLEXIBLE ULTRASONIC WAVE GENERATING DEVICE

(71) Applicants: OSAKA UNIVERSITY, Suita (JP); NexFi Technology Inc., Suita (JP)

(72) Inventors: Takashi Nakamura, Suita (JP); Tsuyoshi Funaki, Suita (JP); Kiyokazu Nakajima, Suita (JP); Yuji Kokubo, Fukushima (JP)

(73) Assignees: Osska University, Osaka (JP); NexFi Technology Inc., Osaka (JP)

( * ) Notice: Subject to any disclaimer, the term of this patent is extended or adjusted under 35 U.S.C. 154(b) by 354 days.

(21) Appl. No.: 18/018,950

(22) PCT Filed: Aug. 4, 2021

(86) PCT No.: PCT/JP2021/028975
§ 371 (c)(1),
(2) Date: Jan. 31, 2023

(87) PCT Pub. No.: WO2022/030554
PCT Pub. Date: Oct. 2, 2022

(65) Prior Publication Data
US 2023/0285046 A1    Sep. 14, 2023

(30) Foreign Application Priority Data
Aug. 4, 2020    (JP) .................... 2020-132615

(51) Int. Cl.
*A61B 17/32*    (2006.01)
(52) U.S. Cl.
CPC ............ *A61B 17/320068* (2013.01); *A61B 17/320016* (2013.01); *A61B 2017/320074* (2017.08)

(58) Field of Classification Search
CPC .. A61B 8/00; A61B 8/12; A61B 8/445; A61B 8/44; A61B 8/4444; A61B 8/02; A61B 8/04; A61B 8/06; A61B 8/08; A61B 8/10; A61B 8/4488; A61B 8/4483; A61B 8/4477; A61B 8/4494; A61B 17/22004; A61B 17/22012; A61B 2017/22014; A61B 17/2202; A61B 2017/22015; A61B 2017/22017; A61B 2017/22018; A61B 17/320016; A61B 17/320068;
(Continued)

(56) References Cited

U.S. PATENT DOCUMENTS 10,363,014 B1 *  7/2019  Steinberg ........... A61B 1/00133
2009/0030312 A1  1/2009  Hadjicostis
(Continued)

FOREIGN PATENT DOCUMENTS

| JP | 562-268549 A | 11/1987 |
| JP | 2010-534526 A | 11/2010 |
| WO | 2019/034500 A1 | 2/2019 |

*Primary Examiner* — Katherine Shi
(74) *Attorney, Agent, or Firm* — Carrier, Shende & Associated P.C.; Joseph P. Carrier; Jeffrey T. Gedeon (57) ABSTRACT

A flexible ultrasonic wave generating device (2) is inserted into a flexible tube (10) having flexibility, and an inductor (15), a discharge resistor (21), an FET (22), and an SBD (23) constituting a drive circuit (25) are mounted on first to third flexible substrates (11) to (13). An actuator (14) is connected to the distal end portion of the flexible ultrasonic wave generating device (2). An active blade (30) is attached to the actuator (14).

10 Claims, 5 Drawing Sheets

(58) Field of Classification Search
CPC ........ A61B 17/320092; A61B 18/1492; A61B 2017/22027; A61B 2017/320074; A61B 2017/320071; A61N 7/00; A61N 2007/0052

See application file for complete search history.

(56) References Cited

U.S. PATENT DOCUMENTS

| | | | |
|---|---|---|---|
| 2013/0109974 A1* | 5/2013 | Nishina | A61B 8/4488 |
| | | | 600/461 |
| 2016/0045247 A1* | 2/2016 | Heim | A61B 18/1206 |
| 2019/0053781 A1 | 2/2019 | Stigall et al. | |
| 2019/0053785 A1 | 2/2019 | Stigall et al. | |

* cited by examiner

FLEXIBLE ULTRASONIC WAVE GENERATING DEVICE

TECHNICAL FIELD

The present invention relates a flexible ultrasonic wave generating device.

BACKGROUND ART

Conventionally, surgery using a bendable endoscope has been widely performed. Various types of forceps can be used for treatment when inserted from the inlet of an endoscope and protruding from the distal end surface of the endoscope.

Also known is an ultrasonic scalpel for performing surgery by using ultrasonic vibrations (see, for example, Patent Literature 1). The distal end portion (the base of the scalpel part) of the ultrasonic scalpel is provided to be bendable.

CITATION LIST

Patent Literature

Patent Literature 1: Japanese Patent Application Laid-Open No. S62-268549

SUMMARY OF INVENTION

Technical Problem

In the ultrasonic scalpel described in Patent Literature 1, since only the distal end portion can be bent, the scalpel cannot be inserted into a desired position in a body, resulting in poor operability.

The present invention has been made in view of such a background, and an object of the present invention is to provide an ultrasonic wave generating device capable of improving operability when performing surgery.

Solution to Problem

[1] The flexible ultrasonic wave generating device of the present invention is a flexible ultrasonic wave generating device that is bendable, the device including an actuator configured to generate ultrasonic waves, a flexible substrate, and a drive circuit configured to have a plurality of electronic components mounted on the flexible substrate and drive the actuator.

According to the flexible ultrasonic wave generating device of the present invention, since the plurality of electronic components that constitutes the drive circuit is mounted on the flexible substrate and the drive circuit is bendable, it is possible to constitute a flexible ultrasonic wave generating device that is bendable. As a result, it is possible to improve the operability when performing surgery by using the flexible ultrasonic wave generating device.

[2] It is preferable that the drive circuit generates a pulsed voltage.

According to the above configuration, ultrasonic waves can be reliably and stably generated.

[3] It is preferable that the drive circuit includes an inductor, an input-side field effect transistor, an output-side field effect transistor, a Schottky barrier diode, and a discharge resistor, and the inductor, the input-side field effect transistor, the Schottky barrier diode, the output-side field effect transistor, and the discharge resistor are disposed in this order.

According to the above configuration, it is possible to reliably generate ultrasonic waves while configuring the drive circuit to be compact and bendable.

[4] It is preferable that the actuator vibrates ultrasonic waves.

According to the above configuration, it is possible to improve the operability when performing surgery by ultrasonic vibrations of the flexible ultrasonic wave generating device.

[5] It is preferable that the flexible ultrasonic wave generating device includes a flexible tube configured to have flexibility, into which the actuator and the drive circuit are inserted, in which a treatment instrument is attached to the actuator.

According to the above configuration, since the ultrasonic wave generating device is bendable, even when the ultrasonic wave generating device is inserted into a body, the ultrasonic wave generating device can be bent along the bend of the body, thereby performing surgery by using a treatment instrument.

[6] It is preferable that the flexible ultrasonic wave generating device includes a flexible tube configured to have flexibility, into which the actuator and the drive circuit are inserted, in which the flexible tube passes through an interior of an endoscope from a forceps inlet of the endoscope and an endoscopic treatment instrument is attached to the actuator.

According to the above configuration, since the ultrasonic wave generating device is bendable, even when the ultrasonic wave generating device is inserted into the endoscope, the ultrasonic wave generating device can be bent following the bend of the endoscope, thereby performing surgery by using the ultrasonic wave generating device inserted into the endoscope.

DESCRIPTION OF EMBODIMENTS

Hereinafter, embodiments of the present invention will be described with reference to drawings.

First, an example of a flexible ultrasonic wave generating device 2 embodying the present invention will be described.

Figure 1:
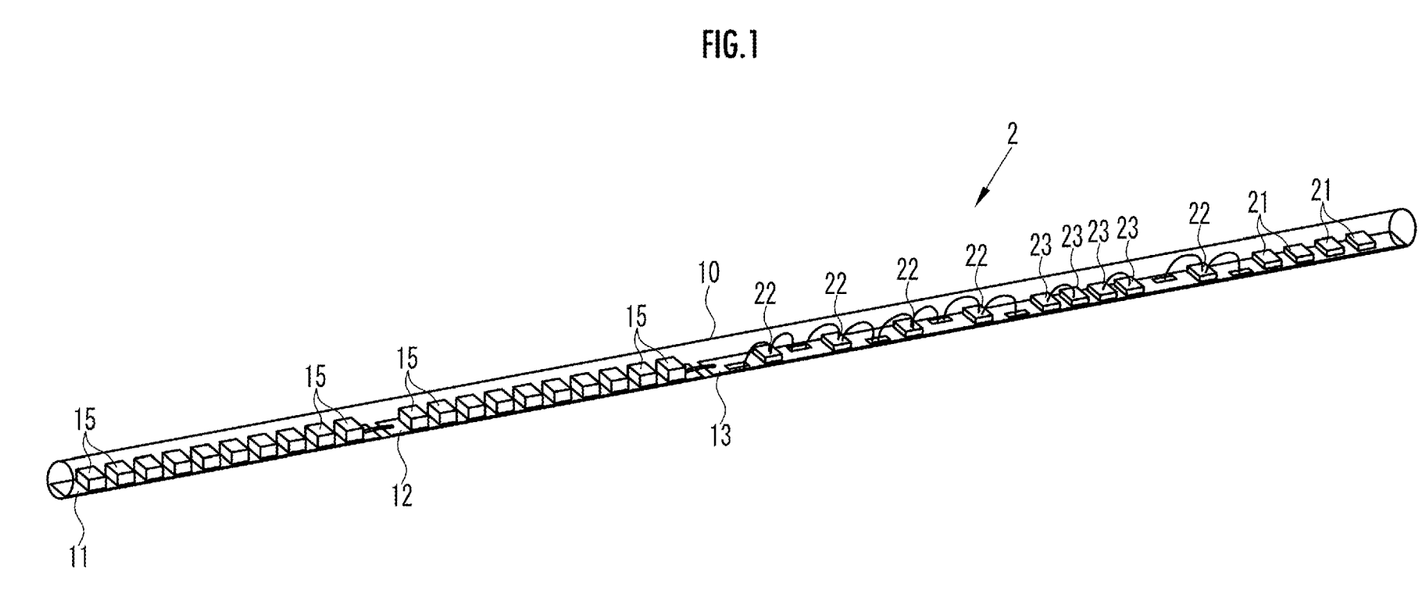
FIG. 1 is a perspective diagram illustrating a flexible ultrasonic wave generating device.

The flexible ultrasonic wave generating device 2 is inserted into a transparent flexible tube 10 having flexibility with a small diameter (for example, 3 mm diameter), for example, and various electronic components are mounted on first to third flexible substrates 11 to 13. An actuator 14 is connected to the distal end portion of the flexible ultrasonic wave generating device 2 (the distal end portion of the third flexible substrate 13). In the present embodiment, the actuator 14 is composed of, for example, a ceramic piezoelectric element such as PZT.

In the present embodiment, a plurality of inductors 15 is mounted on the first and second flexible substrates 11 and 12, and the first flexible substrate 11 and the second flexible substrate 12 are wire-connected.

A discharge resistor 21, a field effect transistor (FET) 22, and a Schottky diode (SBD) 23 are mounted on the third flexible substrate 13.

The FET 22 closer to the inductor 15 than the SBD 23 is the input-side FET 22, and the FET 22 closer to the discharge resistor 21 than the SBD 23 is the output-side FET 22. The electronic components 15, and 21 to 23 constituting a drive circuit 25 (see FIGS. 2 and 3) are mounted on the first to third flexible substrates 11 to 13.

The SBD 23 is a unipolar device that obtains rectifying properties by means of a Schottky junction that brings a metal and a semiconductor into contact. Therefore, when a forward voltage is applied from the outside, the SBD 23 has characteristics that the energy barrier seen from the semiconductor side becomes smaller and electrons flow from an n-type semiconductor to the metal over the smaller barrier.

Figure 2:
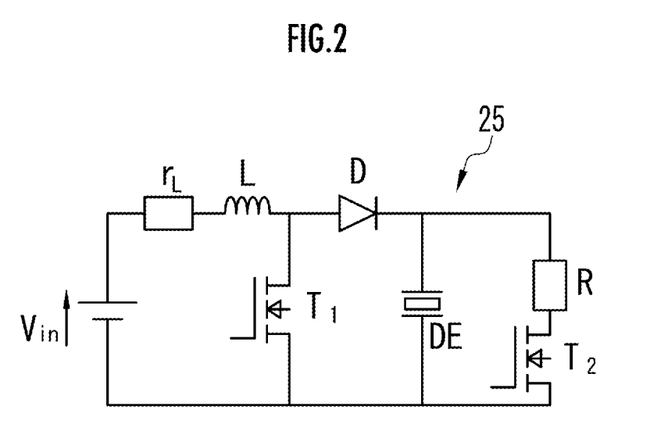
FIG. 2 is a circuit diagram illustrating a flexible ultrasonic wave generating device.

FIG. 2 is a circuit diagram illustrating the flexible ultrasonic wave generating device 2, the inductor 15 is IL and L, T1 is the input-side FET 22, T2 is the output-side FET 22, D is the SBD 23, R is the discharge resistor 21, and DE is the actuator 14 regarded as a capacitor.

Next, the action of the flexible ultrasonic wave generating device 2 having the above configuration will be described. More specifically, a case of performing treatment (surgery) by using the flexible ultrasonic wave generating device 2 on an affected area requiring treatment after an examination using a laparoscope (not illustrated) will be described.

First, laparoscopic examination will be described. Laparoscopic examination is well known and detailed description thereof will be simplified. For this examination, for example, a small hole (for example, 5 mm to 12 mm) is made in a patient's abdomen, a tubular instrument called a port is inserted through the hole, and then carbon dioxide is fed from the port to inflate the abdomen and make it easier to observe inside of the abdomen. Then, a laparoscope is inserted into the abdomen through the port and the organs such as the stomach, large intestine, and gallbladder are displayed on a monitor for examination. If the affected area requiring treatment is found with this examination, the laparoscope is removed.

Figure 3:
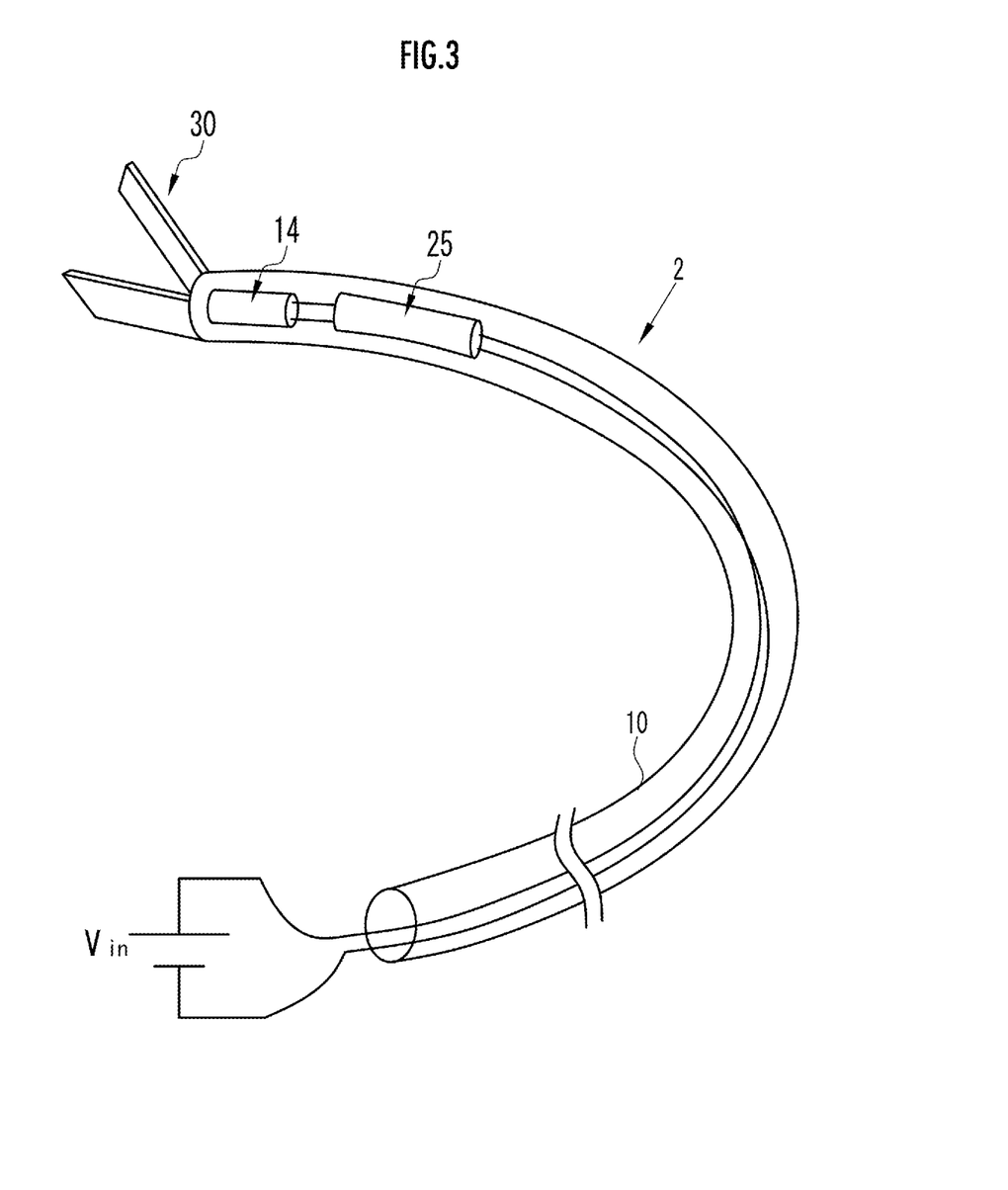
FIG. 3 is a perspective diagram illustrating a state where an active blade is attached to the flexible ultrasonic wave generating device.

Then, as illustrated in FIG. 3, a treatment instrument suitable for treatment of the affected area, for example, an active blade 30 (treatment instrument) is attached to the actuator 14 of the flexible ultrasonic wave generating device 2 and inserted up to the vicinity of the affected area in the body through the port. At this time, the active blade 30 may be inserted while being housed in the flexible tube 10.

Next, a voltage is applied to the flexible ultrasonic wave generating device 2, and the drive circuit 25 causes the actuator 14 to vibrate. The vibration of the actuator 14 causes the active blade 30 to vibrate, and the affected area can be treated with ultrasonic vibrations. In the present embodiment, for example, it is configured to vibrate with ultrasonic waves of 20 kHz or more. After treating the affected area, the flexible ultrasonic wave generating device 2 is removed from the body.

In the present embodiment, the flexible ultrasonic wave generating device 2 is inserted into the flexible tube 10, and each of the electronic components 15, 21 to 23 constituting the drive circuit 25 is mounted on the first to third flexible substrates 11 to 13. As a result, the flexible ultrasonic wave generating device 2 can be configured to be bendable, and the flexible ultrasonic wave generating device 2 can be bent according to the bend shape of the body.

Further, since the drive circuit 25 is composed of the inductor 15, the discharge resistor 21, the FET 22, and the SBD 23, it is possible to obtain the driving force for ultrasonic vibrations of the actuator 14 while the flexible ultrasonic wave generating device 2 is bendable. Furthermore, since the drive circuit 25 generates a pulsed voltage, the actuator 14 can reliably vibrate ultrasonic waves.

Furthermore, since the voltage is boosted by the drive circuit 25 (the electronic components 15, and 21 to 23) in the flexible tube 10, the flexible tube 10 in front of the drive circuit 25 has a low voltage and is highly safe.

Also, since an expensive Ti alloy is not used, the cost can be reduced as compared with the case of using the Ti alloy.

The flexible ultrasonic wave generating device 2 can also be used by being inserted into an endoscope 51.

Figure 4:
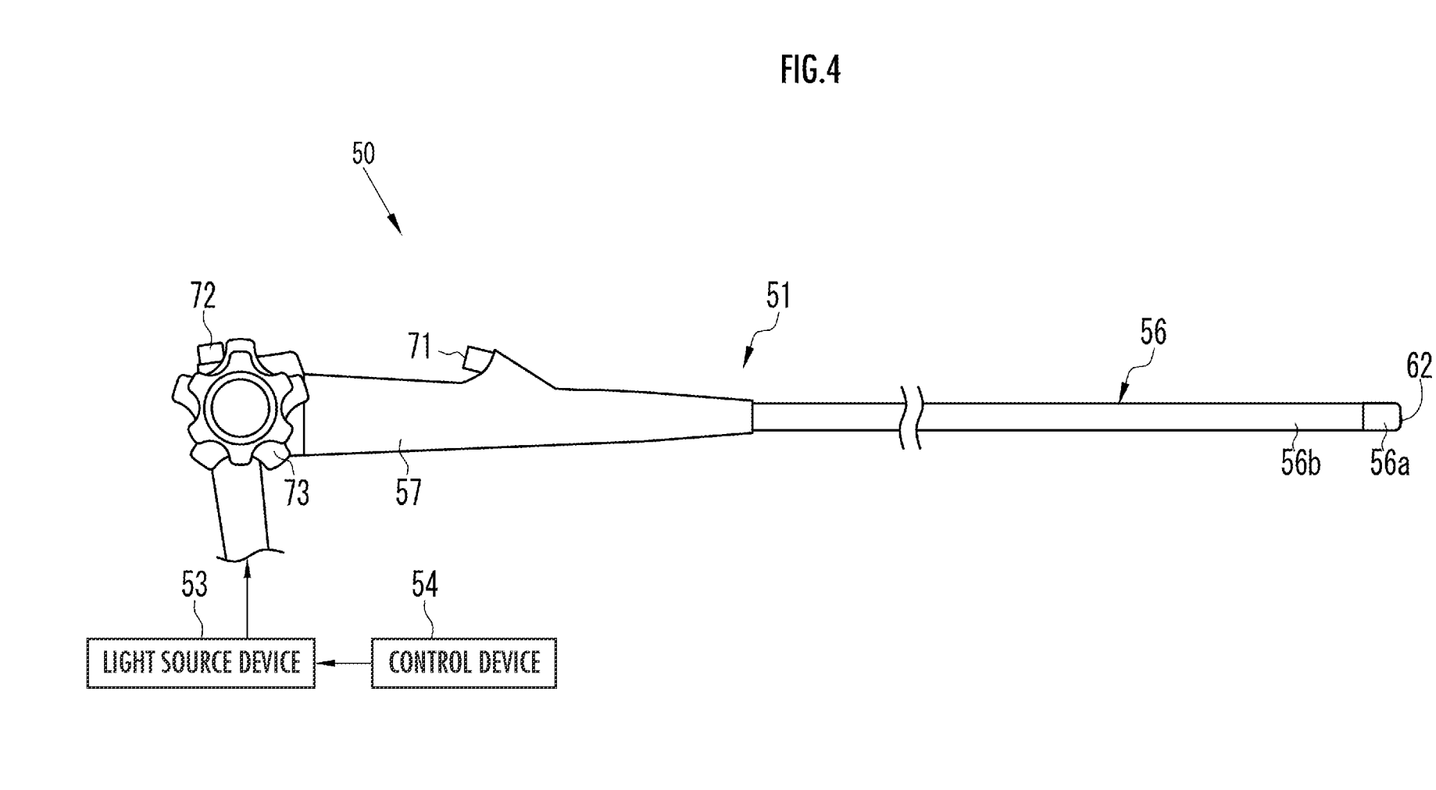
FIG. 4 is a schematic diagram illustrating an endoscope system.
Figure 5:
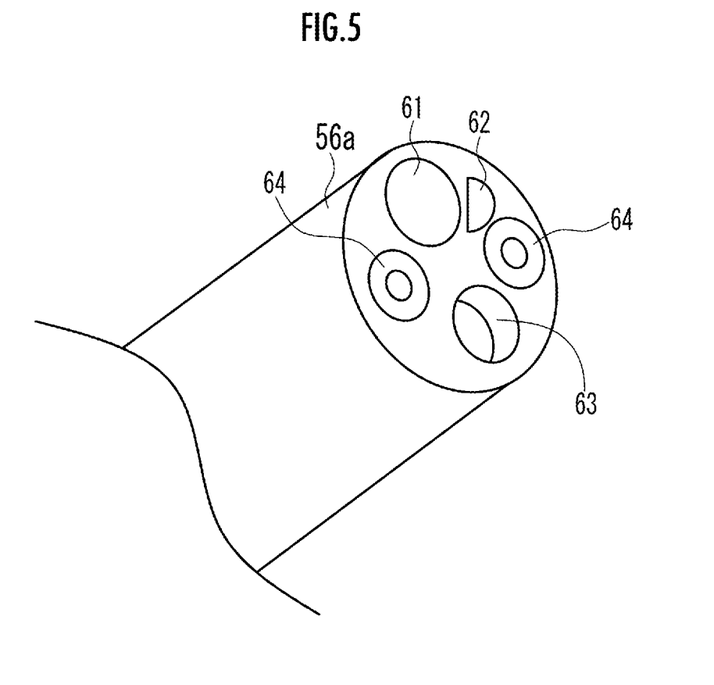
FIG. 5 is a diagram illustrating the distal end portion of an endoscope.

As illustrated in FIGS. 4 and 5, an endoscope system 50 includes the endoscope 51, the flexible ultrasonic wave generating device 2 inserted into the endoscope 51, a light source device 53 connected to the endoscope 51 and transmitting light to the endoscope 51, and a control device 54. A well-known air/liquid feeding device (not illustrated) for feeding gas (air, gas, and the like) and liquid (cleaning water, and the like) to the endoscope 51 is incorporated into the light source device 53.

The endoscope 51 is a well-known one, and although the detailed description thereof will be simplified, the endoscope 51 includes an insertion portion 56 to be inserted into the body and an operation portion 57 connected to the base portion of the insertion portion 56.

The insertion portion 56 includes a distal end portion 56a and a bending portion 56b configured to be bendable. A camera for imaging the inside of the body is incorporated into the distal end portion 56a. An objective lens 61 for camera imaging, a nozzle 62, a forceps outlet 63, and a light guide 64 for irradiating with light from the light source device 53 to illuminate the surgical field are provided on the distal end surface of the distal end portion 56a.

The control device 54 that controls the entire operation of the endoscope system 50 is connected to the light source device 53. This control device 54 controls the drive of the camera via a connection cable (not illustrated) passing through the inside of the endoscope 51. The image data captured by the camera is sent to the control device 54 via a connection cable and displayed on a display (not illustrated).

The operation portion 57 is provided with a forceps inlet 71, an operation button 72 that is operated when air and liquid are fed, and a bending operation knob 73. When the bending operation knob 73 is operated, the wire inserted into the insertion portion 56 is pushed and pulled, thereby bending the bending portion 56b of the insertion portion 56 in the vertical and horizontal directions. As a result, the distal end portion 56a is directed in a desired direction within the body.

When the operation button 72 is operated, the gas and liquid are fed to the nozzle 62 provided on the distal end surface of the insertion portion 56 via a delivery pipeline (not illustrated) provided inside the endoscope 51. The nozzle 62 emits gas and liquid toward the distal end surface of the endoscope 51.

The forceps inlet 71 communicates with the forceps outlet 63 provided on the distal end surface of the insertion portion 56 via a forceps channel (not illustrated) provided inside the endoscope 51. As a result, it is possible to make the forceps (for example, the flexible ultrasonic wave generating device 2) inserted from the forceps inlet 71 protrude from the forceps outlet 63 through the forceps channel.

Next, the action of the endoscope 51 having the above configuration will be described. The insertion portion 56 is inserted through the anus into the body, for example, the intestinal tract. The light from the light source device 53 passes through a cable or the like to be irradiated in front of the insertion portion 56 of the endoscope 51. The image data captured by the camera provided at the distal end portion 56a of the insertion portion 56 is sent to the control device 54 via the connection cable and displayed on the display.

When an affected area is found during observation of the intestinal tract, a treatment instrument suitable for treatment of this affected area, for example, the flexible ultrasonic wave generating device 2 in which the active blade 30 (endoscopic treatment instrument) is attached to the actuator 14 is inserted into the forceps inlet 71 of the endoscope 51 to make the active blade 30 protrude from the forceps outlet 63.

Next, a voltage is applied to the flexible ultrasonic wave generating device 2, and the drive circuit 25 causes the actuator 14 to vibrate. The vibration of the actuator 14 causes the active blade 30 to vibrate, and the affected area can be treated with ultrasonic vibrations. In the present embodiment, for example, it is configured to vibrate with ultrasonic waves of 20 kHz or more. After treating the affected area, the insertion portion 56 is removed from the body.

In the present embodiment, the flexible ultrasonic wave generating device 2 is inserted into the flexible tube 10, and the electronic components 15, and 21 to 23 are mounted on the first to third flexible substrates 11 to 13. As a result, the flexible ultrasonic wave generating device 2 can be configured to be bendable, and when the bending portion 56b of the insertion portion 56 is bent, the first to third flexible substrates 11 to 13 are bent accordingly, thereby bending the flexible ultrasonic wave generating device 2.

Although the present invention has been described in terms of the preferred embodiments thereof, it should be readily apparent to those skilled in the art that the present invention is not limited to such embodiments and that can be changed appropriately within a range not deviating from the purpose of the present invention.

For example, although the active blade 30 is attached to the actuator 14, various treatment instruments can be attached.

The actuator 14 is not limited to a piezoelectric element made of ceramic, but may be made of, for example, a dielectric elastomer containing silicone resin, or may be one that does not vibrate ultrasonic waves.

DESCRIPTION OF REFERENCE NUMERALS

2: flexible ultrasonic wave generating device
10: flexible tube
11 to 13: first to third flexible substrate
14: actuator
15: inductor
21: discharge resistor
22: FET
23: SBD
25: drive circuit
30: active blade (treatment instrument, endoscopic treatment instrument)
50: endoscope system
51: endoscope

The invention claimed is:

1. A flexible ultrasonic wave generating device that is bendable, the device comprising:
    an actuator configured to generate ultrasonic waves;
    a flexible substrate;
    a drive circuit comprising a plurality of electronic components mounted on the flexible substrate to drive the actuator;
    a flexible tube configured to have a flexibility, into which the actuator and the drive circuit are inserted; and
    an active blade attached to the actuator.

2. The flexible ultrasonic wave generating device according to claim 1, wherein
    the drive circuit is configured to generate a pulsed voltage.

3. The flexible ultrasonic wave generating device according to claim 1, wherein
    the plurality of electronic components of the drive circuit include
    an inductor,
    an input-side field effect transistor,
    an output-side field effect transistor,
    a Schottky barrier diode, and
    a discharge resistor, and
    the inductor, the input-side field effect transistor, the Schottky barrier diode, the output-side field effect transistor, and the discharge resistor are disposed in this order.

4. The flexible ultrasonic wave generating device according to claim 1, wherein
    the actuator is configured to vibrate ultrasonic waves.

5. The flexible ultrasonic wave generating device according to claim 1, wherein
    the flexible tube is configured to pass through an interior of an endoscope from a forceps inlet of the endoscope.

6. A flexible ultrasonic wave generating device that is bendable, the device comprising:
    an actuator configured to generate ultrasonic waves;
    a flexible substrate;
    a drive circuit comprising a plurality of electronic components mounted on the flexible substrate to drive the actuator; and wherein
    the plurality of electronic components of the drive circuit include an inductor,
    an input-side field effect transistor,
    an output-side field effect transistor,
    a Schottky barrier diode, and
    a discharge resistor, and
    the inductor, the input-side field effect transistor, the Schottky barrier diode, the output-side field effect transistor, and the discharge resistor are disposed in this order.

7. The flexible ultrasonic wave generating device according to claim 6, wherein the drive circuit is configured to generate a pulsed voltage.

8. The flexible ultrasonic wave generating device according to claim 6 wherein the actuator is configured to vibrate ultrasonic waves.

9. The flexible ultrasonic wave generating device according to claim 6, further comprising:
    a flexible tube configured to have flexibility, into which the actuator and the drive circuit are inserted, wherein
    an ultrasonic treatment instrument is attached to the actuator.

10. The flexible ultrasonic wave generating device according to claim 6, further comprising:
    a flexible tube configured to have flexibility, into which the actuator and the drive circuit are inserted, wherein
    the flexible tube is configured to pass through an interior of an endoscope from a forceps inlet of the endoscope, and an endoscopic treatment instrument is attached to the actuator.

\* \* \* \* \*